3,720,643
FIRE RETARDANT POLYMERIC MATERIALS
Ismat Ali Abu-Isa, Birmingham, and Harold E. Trexler, Harper Woods, Mich., assignors to General Motors Corporation, Detroit, Mich.
No Drawing. Filed June 21, 1971, Ser. No. 155,257
Int. Cl. C08f 45/04
U.S. Cl. 260—41.5 A
4 Claims

ABSTRACT OF THE DISCLOSURE

The addition of suitable minor portions of talc, chlorinated polyethylene and antimony trioxide to polypropylene resins, styrene-acrylonitrile copolymer resins or acrylonitrile-butadiene-styrene resins renders these polymers nonburning. The presence of the talc contributes synergistically to the flame retardancy of the compositions permitting a reduction in the quantities of the chlorine-containing and antimony-containing additives otherwise employed for this purpose.

---

This invention relates to certain flame resistant and nonburning polymer compositions containing talc. More specifically, this invention relates to polymer compositions containing antimony trioxide, chlorinated polyethylene and talc, wherein the talc enhances the flame retardancy effect of the other additives and permits a reduction in the amounts of these other additives employed.

It has been recognized that certain polymers may be rendered flame resistant or nonburning by the addition of suitable amounts of antimony oxide and a halogenated compound, such as a chlorinated paraffin, a chlorinated aromatic or chlorinated polyethylene. Usually both the antimony compound and the chlorinated organic compound must be incorporated into the polymer to provide the desired fire retardant effect. It would be desirable to be able to reduce the amounts of both the halogenated material and the antimony oxide employed in a polymer composition because of possible health hazards associated with relatively high concentrations of these materials if the polymer composition should be consumed by fire. Furthermore, antimony oxide is relatively expensive and it would be advantageous to substitute a less expensive material for it.

Accordingly, it is an object of our invention to provide nonburning compositions of polypropylene resins, styrene-acrylonitrile copolymer resins or acrylonitrile-butadiene-styrene resin containing antimony oxide, chlorinated polyethylene and talc, wherein the talc coacts with the antimony oxide and chlorinated polyethylene to impart fire retardancy to the polymer and permit a reduction in the amounts of the chlorine- and antimony-containing additives employed.

In accordance with a preferred embodiment of our invention, these and other objects are accomplished by milling together or otherwise suitably mixing together, by weight, 55 to 79 parts of polypropylene, ABS resin or SAN copolymer, 5 to 20 parts talc, 10 to 20 parts chlorinated polyethylene and 1 to 5 parts antimony oxide, so that the total formulation constitutes 100 parts by weight. Preferably, 3 to 5 parts of antimony oxide, 12 to 15 parts of chlorinated polyethylene and 10 to 15 parts talc are employed. We have found that talc, unlike any other filler materials of which we are aware, interacts with the two known flame retardant additives to enhance the nonburning properties of the above class of polymers. The talc appears to retard the evolution of hydrochloric acid from the chlorinated polyethylene at high temperatures and thereby prolongs the flame retardant activity of the halogenated material for extended periods of time. The addition of talc permits the use of lesser quantities of conventional flame retardant additives to achieve the same degree of fire retardancy. The use of talc in addition to normal average quantities of antimony oxide and chlorinated polyethylene employed typically increases the flame retardancy of the polymer.

Other objects and advantages of our invention will become more apparent from a detailed description thereof which follows.

As used in this application the terms "nonburning" or "flame resistant" apply to those polymer compositions of which molded specimens were repeatedly exposed to the hot flame of a gas burner in accordance with the stringent Hooker HLT-15 test, and which did not continue to burn upon removal from the burner flame. The Hooker HLT-15 procedure for evaluating the flame retardant properties of a polymer formulation is described in Hooker Chemical Corporation Technical Bulletin No. 66, page 12, dated 1967.

In the examples described hereinbelow, specimens of a particular polymer formulation 5" x ½" x ½" were prepared in general accordance with the Hooker HLT-15 procedure. Each individual specimen was held in a vertical position with one end in the hottest portion of the flame of a Bunsen burner. The specimen was successively and repeatedly placed in the flame and removed from the flame in accordance with the following procedure:

(1) The rectangular specimen was first held in the Bunsen flame for five seconds and then removed from the flame for ten seconds. If the specimen was observed to stop burning, as indicated by the extinguishing of its flame within the ten second period, four points were awarded. If the flame on the specimen was not extinguished within ten seconds the testing of the specimen was discontinued and no points awarded.

(2) The specimen was again placed in the Bunsen flame for seven seconds and then removed for fourteen seconds to see if any flame produced on the specimen went out. If it did, four additional points were awarded. If the flame was not extinguished the test was stopped at this point.

(3) The specimen was placed in the Bunsen flame for ten seconds and then removed for twenty seconds. If the flame on the specimen was extinguished it was awarded four additional points. If the flame was not extinguished the test was discontinued at this point.

(4) The specimen was returned to the Bunsen flame for fifteen seconds and removed for thirty seconds. If it successfully extinguished its flame it was awarded an additional four points. If the flame did not go out in thirty seconds the test was discontinued with respect to the specimen.

(5) The specimen was placed in the flame for twenty-five seconds and removed for fifty seconds. If it extinguished its flame it was awarded four more points. If the flame did not go out no points were awarded.

Thus, a specimen which was placed in the flame five times and upon removal extinguished its own flame each time within the alloted period received a total of twenty points. The test was repeated two additional times with two different specimens of the same formulation and the results of the three tests combined. A given formulation could therefore obtain a maximum of sixty points. Such a formulation is characterized herein as fully nonburning. A formulation does not receive any points if its flame was not extinguished after the first heating period of each specimen tested. An intermediate number of points could be received depending on how long the respective specimens tested were able to extinguish their flame. Nonburning formulations are those which received sixty out of sixty possible points.

A number of different polypropylene compositions were prepared, some containing small amounts of antimony trioxide, chlorinated polyethylene and talc. The mixtures were prepared by combining the ingredients in predetermined amounts in an extruder, granulating the extrudate and subsequently injection molding a number of specimens suitable for the Hooker HLT-15 test described above, the Izod impact test (ASTM Designation No. D256-56) and heat distortion test (ASTM Designation No. D648-56). The compositions of these polypropylene formulations and the results of the Hooker HLT-15 test, the Izod notched impact strength and the heat distortion test are summarized in the following table. The talc (a magnesium silicate) which was used in all of the following examples was International Talc P725. The chlorinated polyethylene used in the following examples was Dow MX2243.25. The values of impact strength summarized in the following table are in foot/pounds per inch of notch. The results of the HLT-15 test are expressed as a fraction wherein the numerator is the total points awarded three test specimens and the denominator is 60, the maximum possible number of points.

TABLE 1

| Weight percent | | | | HLT-15 test | Impact strength | Heat defl. at 264 p.s.i., °C. |
|---|---|---|---|---|---|---|
| Polypropylene* | Sb₂O₃ | CPE | Talc | | | |
| 95 | 5 | 0 | 0 | 0/60 | 0.52 | 71 |
| 75 | 5 | 20 | 0 | 24/60 | 0.4 | 62 |
| 60 | 5 | 35 | 0 | 56/60 | 0.37 | 59 |
| 65 | 5 | 20 | 10 | 60/60 | 0.34 | 63 |
| 65 | 5 | 15 | 15 | 60/60 | 0.51 | 68 |
| 67 | 3 | 15 | 15 | 60/60 | | |
| 70 | 15 | 15 | 0 | 60/60 | | |

*Hercules Polypropylene 6523.

The data above indicates that polypropylene samples containing 5% by weight antimony trioxide and 20% by weight chlorinated polyethylene were partially self-extinguishing, but not fully nonburning in accordance with the Hooker test. When the chlorinated polyethylene content was increased to 35% by weight, the polypropylene fully nonburning. However, when talc was added in amounts of 10% to 15% by weight the formulation was fully nonburning in accordance with the Hooker test and it was possible to reduce the quantities of chlorinated polyethylene and/or antimony trioxide.

A number of acrylonitrile-butadiene-styrene formulations were prepared. The components were combined and mixed in an extrusion device. The extrudate was pelletized and injection molded into suitable test specimens for the Hooker HLT-15 test, the Izod notched impact strength test and heat deflection test. The following table summarizes the compositions that were prepared and the flame extinguishing properties, impact resistant properties and heat deflection properties of these materials.

TABLE 2

| Weight percent | | | | HLT-15 test | Impact strength | Heat defl. at 264 p.s.i., °C. |
|---|---|---|---|---|---|---|
| ABS* | Sb₂O₃ | CPE | Talc | | | |
| 100 | 0 | 0 | 0 | 0/60 | 5.84 | 86 |
| 80 | 5 | 15 | 0 | 24/60 | | |
| 74 | 7.5 | 18.5 | 0 | 60/60 | 2.69 | 82 |
| 75 | 5 | 20 | 0 | 60/60 | | |
| 73 | 2 | 15 | 10 | 60/60 | 1.16 | 91 |
| 70 | 5 | 15 | 10 | 60/60 | 1.10 | 86 |
| 66.7 | 16.7 | 16.7 | 0 | 60/60 | 2.01 | 82 |

*Monsanto ABS I-740.

As with the polypropylene formulations, it is seen that the presence of talc contributed to the nonburning properties of the ABS resin and permitted a reduction in the quantities of antimony trioxide and chlorinated polyethylene. The talc reduced the impact strength somewhat but increased the heat deflection temperature of the nonburning ABS formulations.

Some styrene-acrylonitrile copolymer resin formulations were prepared by extruding, pelletizing and injection molding. Some of these formulations and their physical properties are summarized in the following table.

TABLE 3

| Weight percent | | | | HLT-15 test | Impact strength | Heat defl., °C. |
|---|---|---|---|---|---|---|
| SAN | Sb₂O₃ | CPE | Talc | | | |
| 100 | 0 | 0 | 0 | 0/60 | 0.26 | 96 |
| 80 | 10 | 10 | 0 | 28/60 | 0.24 | 93 |
| 67 | 3 | 15 | 15 | 60/60 | 0.22 | 96 |

Again it is seen that the talc interacts significantly with the chlorinated polyethylene and the antimony trioxide to render the styrene-acrylonitrile copolymer nonburning. It is noted that the impact strength and the heat deflection temperature of the copolymer are not significantly adversely affected.

Talc, when used in the subject polymer compositions in the absence of antimony trioxide and chlorinated polyethylene, does not render the compositions nonburning.

So far as we have been able to determine, talc is unique in its synergistic effect with chlorinated polyethylene and antimony trioxide in effectively rendering polypropylene resins, styrene-acrylonitrile copolymer resins and ABS resins nonburning. Among other materials that we have investigated are silica, carbon black, alumina, titanium dioxide, lead oxide, glass fibers, zinc borate and various clays. None of these materials were found to contribute to the nonburning characteristics of the polymers as did talc.

We prefer that our nonburning polymer compositions comprise, by weight, 65% to 75% polymer, 3% to 5% antimony trioxide, 12% to 15% chlorinated polyethylene and 10% to 15% talc. Larger amounts of the flame retardant additives may, of course, be employed but little or no gain in flame retardant properties are achieved and other properties of the polymer may be adversely affected.

While our invention has been described in terms of a few specific preferred embodiments thereof, it is to be expected that other forms could readily be adapted by one skilled in the art. Accordingly, the scope of our invention is to be limited only by the following claims.

What is claimed is:

1. Fire retardant, polymeric compositions consisting essentially by weight of 10% to 15% talc, 12% to 15% chlorinated polyethylene, 3% to 5% antimony trioxide and 65% to 75% of a synthetic resin selected from the group consisting of polypropylene, acrylonitrile-butadiene-styrene (ABS) resin and styrene-acrylonitrile (SAN) copolymer.

2. Fire retardant, polymeric compositions consisting essentially by weight of 10% to 15% talc, 12% to 20% chlorinated polyethylene, 3% to 5% antimony trioxide and the balance polypropylene.

3. Fire retardant, polymeric compositions consisting essentially by weight of 10% to 15% talc, 12% to 15% chlorinated polyethylene, 3% to 5% antimony trioxide and the balance styrene-acrylonitrile (SAN) copolymer resin.

4. Fire retardant, polymeric compositions consisting essentially by weight of 10% to 15% talc, 12% to 15% chlorinated polyethylene, 2% to 5% antimony trioxide and the balance acrylonitrile-butadiene-styrene (ABS) resin.

References Cited
UNITED STATES PATENTS

| 3,553,158 | 1/1971 | Gilfillan | 260—41 A |
| 3,157,614 | 11/1964 | Fischer | 260—41 A |
| 3,121,067 | 2/1964 | Nelson | 106—15 F P |
| 2,894,926 | 7/1959 | Jacobson | 260—41.5 A |
| 3,034,939 | 5/1962 | Newkirk | 106—15 F P |

MORRIS LIEBMAN, Primary Examiner

P. R. MICHL, Assistant Examiner

U.S. Cl. X.R.

260—41 A